US011100160B2

(12) United States Patent
Frank et al.

(10) Patent No.: US 11,100,160 B2
(45) Date of Patent: Aug. 24, 2021

(54) INTELLIGENT IMAGE NOTE PROCESSING

(71) Applicant: INTERNATIONAL BUSINESS MACHINES CORPORATION, Armonk, NY (US)

(72) Inventors: Paul A. R. Frank, Hamburg (DE); Martin G. Keen, Cary, NC (US); Adam Smye-Rumsby, Reading, PA (US); Hernan A. Cunico, Holly Springs, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 16/051,359

(22) Filed: Jul. 31, 2018

(65) Prior Publication Data

US 2020/0042621 A1    Feb. 6, 2020

(51) Int. Cl.
| | | |
|---|---|---|
| *G06F 17/30* | (2006.01) |
| *G06F 17/24* | (2006.01) |
| *G06F 17/27* | (2006.01) |
| *G06F 15/18* | (2006.01) |
| *G06F 16/583* | (2019.01) |
| *G06N 20/00* | (2019.01) |

(Continued)

(52) U.S. Cl.
CPC ........ *G06F 16/5846* (2019.01); *G06F 40/169* (2020.01); *G06F 40/205* (2020.01); *G06N 20/00* (2019.01)

(58) Field of Classification Search
CPC ............... G06F 9/4494; G06F 9/45512; G06F 16/5846; G06F 16/24522; G06F 16/583; G06F 16/5866; G06F 17/27; G06F 16/3326; G06F 16/334; G06F 16/345; G06F 16/50; G06F 16/51; G06F 16/54; G06F 16/5838; G06F 3/048; G06F 40/169; G06F 40/205; G06K 2209/01; G06K 9/4671; G06K 9/00442; G06K 9/00456; G06K 9/00671; G06K 9/00677; G06K 9/00684; G06K 9/6267; G06K 9/78; G06N 20/00; G06N 20/10; G06N 20/20; G06N 3/0445; G06N 3/0454; G06N 3/088; G06N 3/126; G06N 5/003; G06N 5/02; G06N 5/048; G06N 7/005; G06N 7/023; G06Q 30/0222; G06Q 40/00; Y10S 707/99934; Y10S 707/99935; Y10S 707/99936

See application file for complete search history.

(56) References Cited

U.S. PATENT DOCUMENTS

| | | |
|---|---|---|
| 8,098,934 B2 | 1/2012 | Vincent et al. |
| 8,155,444 B2 | 4/2012 | Simmons et al. |
| 8,489,583 B2 | 7/2013 | Phillips et al. |

(Continued)

OTHER PUBLICATIONS

Ozarslan et al., "Comparison of approaches for mobile document image analysis using server supported smartphones," Digital Photography X, vol. 9023, 2014 (9 pages).

*Primary Examiner* — Michael J Vanchy, Jr.
(74) *Attorney, Agent, or Firm* — Griffiths & Seaton PLLC (57) ABSTRACT

Embodiments for intelligent image note processing by a processor. One or more images associated with a user equipment (UE) may be determined to have notation data. The notation data may be extracted from the one or more images to create one or more actions in relation to the notation data.

17 Claims, 6 Drawing Sheets

(51) Int. Cl.
     *G06F 40/169*      (2020.01)
     *G06F 40/205*      (2020.01)

(56) References Cited

U.S. PATENT DOCUMENTS

| | | | |
|---|---|---|---|
| 9,292,186 B2 | 3/2016 | Moore et al. | |
| 2006/0002607 A1* | 1/2006 | Boncyk | G06F 16/5866 |
| | | | 382/165 |
| 2008/0103882 A1* | 5/2008 | Lacomb | G06Q 40/00 |
| | | | 705/14.23 |
| 2009/0002744 A1* | 1/2009 | Shimada | H04N 1/00877 |
| | | | 358/1.15 |
| 2013/0132361 A1* | 5/2013 | Chen | G06F 3/0488 |
| | | | 707/706 |
| 2014/0325348 A1 | 10/2014 | Goktekin | |
| 2015/0135046 A1* | 5/2015 | Moore | G06F 17/212 |
| | | | 715/202 |
| 2018/0025003 A1 | 1/2018 | Marriott et al. | |
| 2018/0336415 A1* | 11/2018 | Anorga | G06K 9/6267 |

\* cited by examiner

INTELLIGENT IMAGE NOTE PROCESSING

BACKGROUND OF THE INVENTION

Field of the Invention

The present invention relates in general to computing systems, and more particularly to, various embodiments for intelligent image note processing by a processor.

Description of the Related Art

In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continues to engender the sharing of a vast amount of information between people.

SUMMARY OF THE INVENTION

Various embodiments for intelligent image note processing by a processor, are provided. In one embodiment, by way of example only, a method for intelligent image note processing, again by a processor, is provided. One or more images associated with a user equipment (UE) may be determined to have notation data. The notation data may be extracted, from the one or more images to create one or more actions in relation to the notation data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The advent of real-time communication made possible by various computing devices enables people to share communication, such as emails, messages, speeches, social media posts, and other content. More specifically, as consumers, businesspersons, educators, and others have become more accessible and globalized, using various computing systems such as, for example, audio and/or video conferencing systems for meetings, conferences, or presentations. Often times, these meetings, conferences, or presentations include topics and subtopics involving participants (e.g., "decision makers") to engage in discussions to reach or make decisions.

These decision discussions often times are unstructured, inefficient and may partially or fully digress from the original topic or subtopic, particularly where decisions need to be made in a collaborative environment. Attempting to gather and provide structured talking points or decisions is currently time consuming and inefficient. Moreover, gathering and summarizing these decision discussions in a structured format from the collaborative environments is currently challenging, labor intensive and error prone. However, having access to such structured representation and summarization of decision discussions would be useful in collaborative decisions: for example, when a final decision maker is required to consult with a group to obtain participant perspectives or when a consensus needs to be achieved amongst multiple participants.

Accordingly, various embodiments are provided herein for the extraction and summarization of key decision elements from discussions from various communications (e.g., audio data, video data, etc.). In one aspect, one or more communications (e.g., conversations) and the contexts of the communications may be tracked from multiple resources or data sources (e.g., video data, audio data, social media posts, video/audio threads, channels, protocols, email, short mail service ("SMS") messages, voice data/messages, and the like) on different applications and/or devices.

In one aspect, data such as, for example, communications, from one or more computing devices, having text data (e.g., transcripts of discussions, blogs, social media posts, etc.) or audio and/or video recordings (with possible timestamps) may be received and gathered. The communications (e.g., text data, audio data, visual data) may be processed so as to 1) automatically transcribe speech data (for audio data) and/or process video data, 2) identify speakers/participants for each specific audio utterance of the data, 3) identify segments within the data pertaining to decision discussions along with the decision topic, 4) automatically extract mentions decision elements, for example criteria, alternatives, tradeoffs, constraints, etc., 5) group, cluster, and/or organize extracted information (including mapping decision alternatives and criteria of each decision), 6) enrich concepts of the decisions/communications by linking the decisions/communications to a domain knowledge (e.g., dbpedia), and/or 7) identify expressed sentiment by one or more participants towards raised decision elements in the communication (e.g., during a meeting). In other words, the present invention may digest and process the audio data, video data, and/or text data for extracting one or more decision elements that may be grouped, coordinated, and organized for later processing.

The mechanisms of the illustrated embodiments may provide a structured summary of one or more decision elements of the communications so as to enable a user, participant, or other third party to interact with the structured summary. The structured summary may be displayed on an interactive graphical user interface ("GUI") as a visual representation of the summary. The visual representation of the summary may a) enable users to filter on keywords, authors/contributors, dates, and/or other selected aspects, b) scrutinize each piece of extracted information in context so as to determine (either automatically performed and/or via a user) as to whether the extracted information was correctly identified or not or simply to help the user understand the meaning, etc., and/or c) 8) identify expressed sentiment by one or more participants towards the decision elements, alternatives to the decisions, and/or criteria of the topics/subtopics. Other examples of various aspects of the illustrated embodiments, and corresponding benefits, will be described further herein.

In aspect, the present invention provides for extraction and summarization of decision discussions of a communication by identifying and extracting decision elements relating to one or more decisions from one or more communications so as to provide a summary of the decision elements.

In an additional aspect, one or more decision elements relating to one or more decisions and criteria may be identified from one or more communications. The decision elements may be grouped together according to similar characteristics. The decision elements may be may be linked, and sentiments of the discussion participants towards each of the decision elements may be analyzed. A summary of the plurality of the decision elements may be provided via an interactive graphical user interface (GUI) on one or more Internet of Things (IoT) devices. The summary of the decision elements may be linked to domain knowledge. The summary may be enhanced using domain knowledge.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
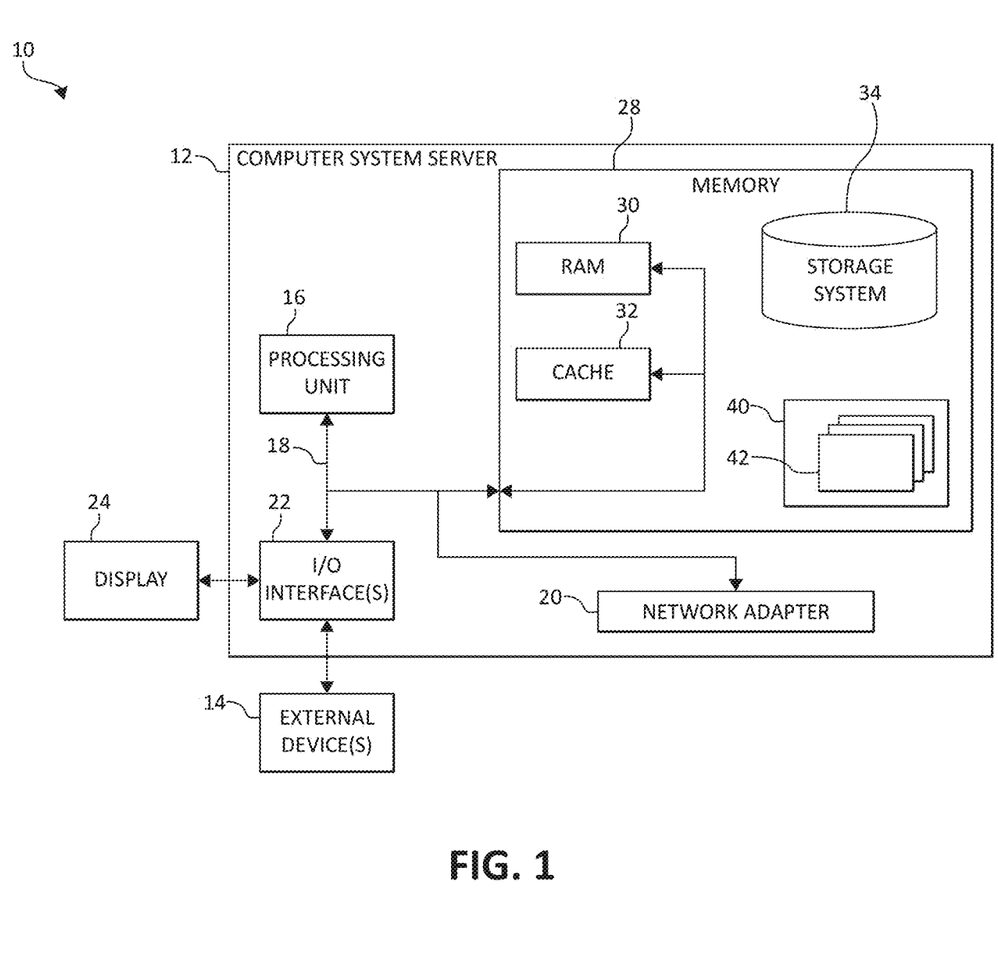
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
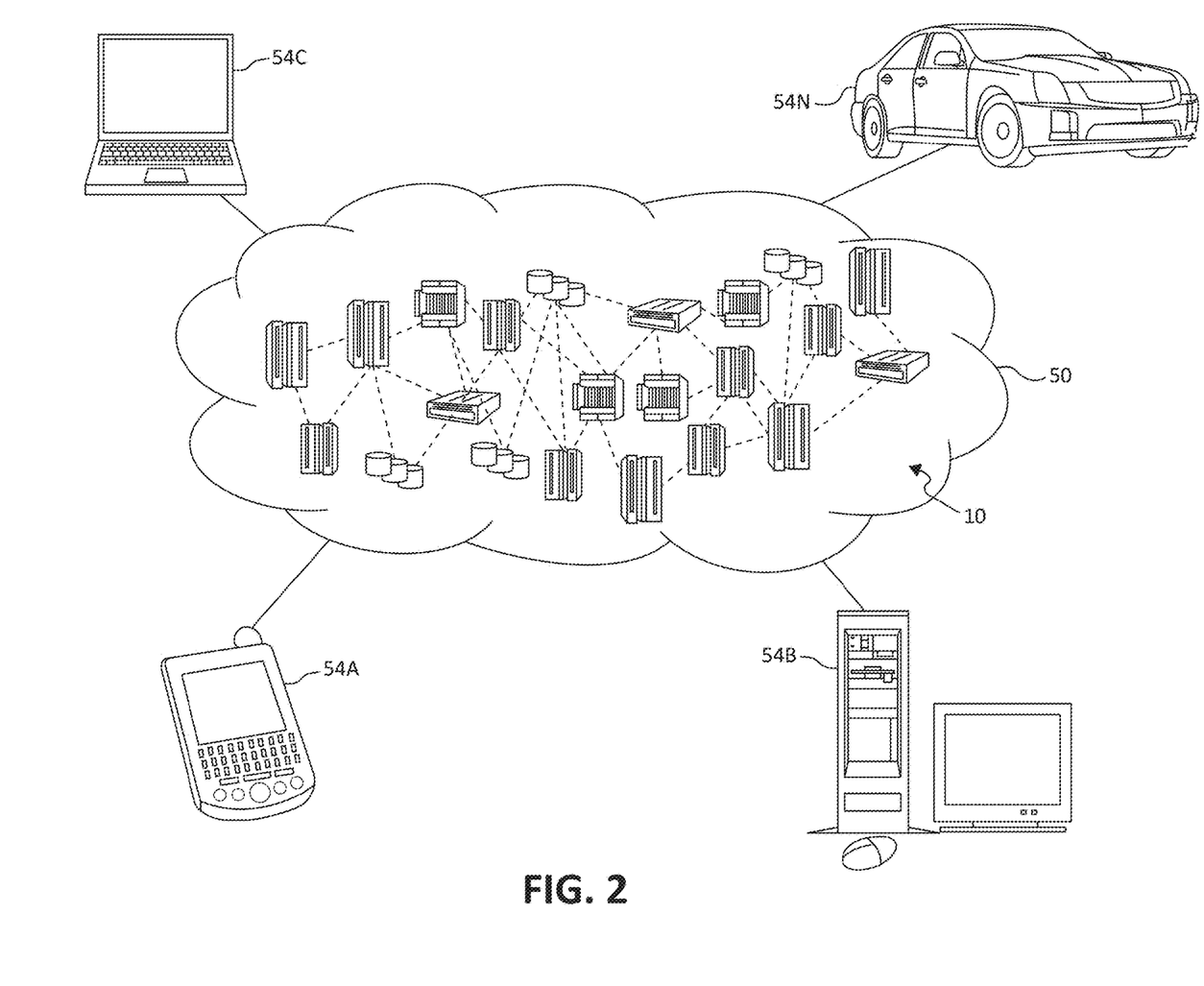
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
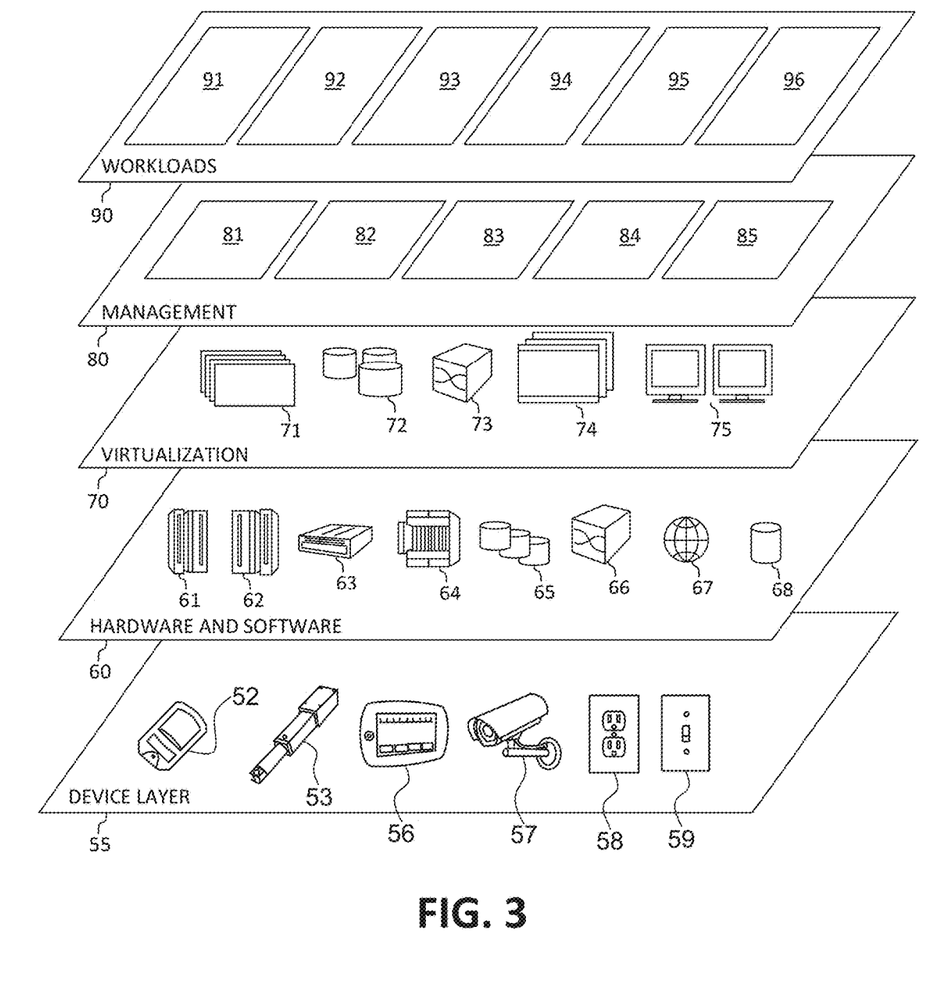
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent image note processing. In addition, workloads and functions 96 for intelligent image note processing may include such operations as data analytics, data analysis, and as will be further described, notification functionality. One of ordinary skill in the art will appreciate that workloads and functions 96 for intelligent image note processing may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for intelligent image note processing. An image captured by a user on a user equipment ("UE") (e.g., a computing device, wireless communication device, an IoT device, camera, media capturing device, tablet, wearable device, etc.) may be analyzed and may tag the captured image as either "save" or "extract." The tagging may be based on a similarity index of prior images. Images with a "save" tag may be saved to a computing device's (e.g., UE and/or IoT device) native photo gallery without additional tasks undertaken. Images tagged with an "extract" tag may be analyzed, and information (e.g., notation data) is extracted. By way of example only, a note or "notation data" may be any data of records of facts, topics, thoughts, events, dates, remarks, drawings, commentary, annotations, and/or explanations, which may be designed as an aid to memory, a reminder, indication to perform some task, and/or used for later recall. The note or "notation data" may also be a special mention of or remark and/or writing designed to assist one or more persons to remember something. Also, a note or "notation data" may be a series or system of written symbols used to represent numbers, amounts, or elements in something.

The extracted information may be further analyzed for one or more regular expressions and keywords such as, for example, dates and/or a service set identifier ("SSID"). After the analysis, the user is notified. For example, if a date was identified on the image indicating an event, then a calendar entry and/or calendar reminder may be created, and the user can accept or decline the added calendar entry or reminder. If accepted, the entry will be stored in the calendar and the original image is deleted.

Figure 4:
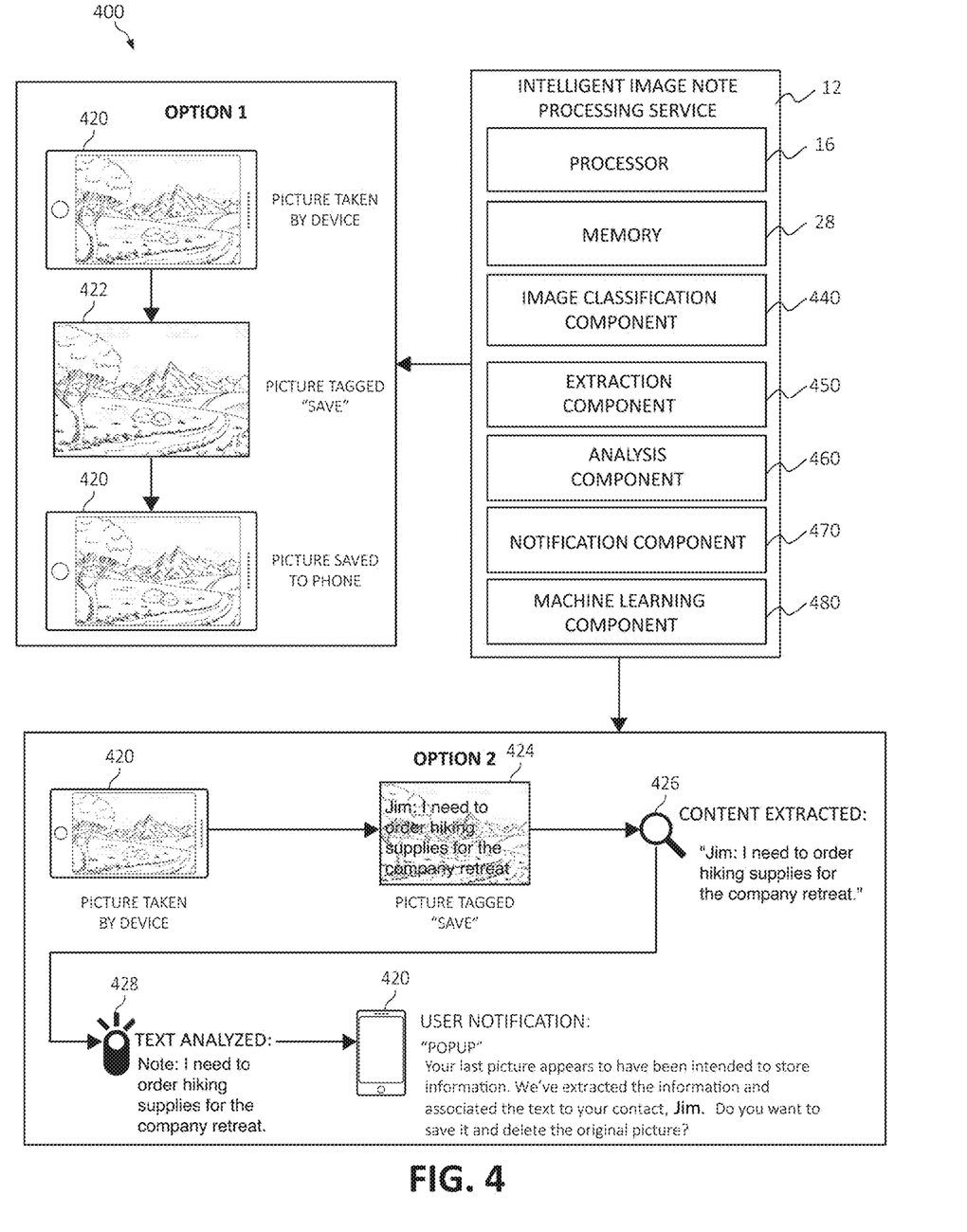
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for intelligent image note processing in an IoT computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

An intelligent image note processing service 410 is shown, incorporating processing unit 16 ("processors) and memory 28 of FIG. 1 to perform various computational, data processing and other functionality in accordance with various aspects of the present invention. The intelligent image note processing service 410 may be provided by the computer system/server 12 of FIG. 1.

As one of ordinary skill in the art will appreciate, the depiction of the various functional units in the intelligent image note processing service 410 is for purposes of illustration, as the functional units may be located within the intelligent image note processing service 410 or elsewhere within and/or between distributed computing components.

The intelligent image note processing service 410 may be in communication with and/or association with one or more image capturing devices 420 (e.g., an internet of things "IoT" computing device such as, for example, a camera, smartphone, desktop computer, laptop computer, tablet, and/or another electronic device that may have one or more processors and memory and configured for capturing images or video data). The image capturing devices 420 and the intelligent image note processing service 410 may each be associated with and/or in communication with each other, by one or more communication methods, such as a computing network, wireless communication network, or other network means enabling communication.

In one aspect, the intelligent image note processing service 410 may provide virtualized computing services (i.e., virtualized computing, virtualized storage, virtualized networking, etc.) to the one or more image capturing devices 420. More specifically, the intelligent image note processing service 410 may provide, and/or be included in, a virtualized computing, virtualized storage, virtualized networking and other virtualized services that are executing on a hardware substrate.

The image note processing service 410 may also function as a database and/or service that may store, maintain, and update data, services, and/or resources internal to and/or external to a cloud computing environment such as described in FIG. 2. In one aspect, image note processing service 410 may assist in providing access to and/or assist in performing one or more various types of data, services and/or resources. In one aspect, the image note processing service 410 may provide an image classification component 440, an extraction component 450, an analysis component 460, a notification component 470, and a machine learning component 480.

In one aspect, the image classification component 440 may identify and determine one or more images associated with a user equipment (UE) having notation data. The image classification component 440 may tag one or more images to extract the notation data (e.g., using an "extraction" tag) and/or tag one or more images failing to include the notation data (e.g., using a "save" tag). In one aspect, the image classification component 440 may be remotely located from the image capturing device 420 and/or locally installed on the image capturing device 420 and in communication with image note processing service 410.

The extraction component 450 may extract the notation data from the one or more images to create one or more actions in relation to the notation data. That is, if the images include the "extraction" tag, the extraction component 450 component may use natural language processing (NLP) to extract the notation data included on the image. Thus, the extraction component 450 may extract from the image such as, for example, using natural language processing and/or Optical Character Recognition (OCR). The extraction component 450 may be remotely located from the image capturing device 420 and/or locally installed on the image capturing device 420 and in communication with image note processing service 410.

In one aspect, the machine learning component 480 may be initiated to learn a classification model such that the classification model distinguishes between those of the one or more images having the notation data (e.g., "extraction" tags) and those of the one or more images failing to include the notation data (e.g., the "save" tags).

The analysis component 460 may analyze the one or more images to learn an intent or purpose of the notation data. The analysis of the images may occur prior to extracting the notation data and/or subsequent to extracting the notation data. The analysis component 460 may be remotely located from the image capturing device 420 and/or locally installed on the image capturing device 420 and in communication with image note processing service 410.

The notification component 470 may notify a user of the one or more actions on the UE (e.g., directly indicated and/or indirectly indicated). The notification component 470, in association with the machine learning component 480, may collect feedback data relating to an evaluation by the user of the one or more actions in relation to the notation data. The notification component 470 may also perform the one or more actions indicated by the notation data. The notification component 470 may be remotely located from the image capturing device 420 and/or locally installed on the image capturing device 420 and in communication with image note processing service 410.

In operation, the image note processing service 410 may be performed in three stages such as, for example, stage 1: a classify new images, stage 2: extract content, stage 3: content analysis, stage 4: user notification, and/or stage 5: feedback and self-learning.

STAGE 1: Classify New Images

An image may be captured by the user on a UE of the user such as, for example, UE 420. The image classification component 440 determines and derives which tag will be assigned to the image. The image classification component 440 may use a classification model operation of the machine learning component 480 for determining which tag to assign the image. The image classification component 440 and/or the UE 420, itself, may provide an application/operation that may group images based on attributes or parameters such as, for example, a location and/or content. If the image is a mountain range, a person, and/or an attraction, the image classification component 440 may assign the appropriate tag. The classification model operation may be trained via the machine learning component 480 to distinguish between two image types: Type 1) actual images (e.g., images captured for the sole purpose of retaining the image without containing notation data), and Type 2) images containing notes or notation data (e.g., images captured with the intention of remembering information (with notes or notation data) stored within the image and retrieving the information later). The training of the classification model operation may occur using the machine learning component 480 locally and/or on a remotely such as, for example on the UE 420 and/or a cloud computing server.

In one aspect, the classification model may learn and/or adapt to a user's personality, preferences, behaviors, and/or interests such as, for example, using computer vision information. For example, a user may use the image capturing device 420 and take images and/or video of a laptop screen to take notes. The classification model operation identifies the laptop in the picture and associates the information to an attribute towards being tagged as "note." The classification model operation may be a one-time effort that produces the classification model operation based on all currently available images. With every new image, the classification model operation can be enhanced. The classification model operation may include a classification model scoring operation. That is, each new image may be scored against the classification model operation and labeled with a tag ("save" or "extract"). Images tagged with "save" are saved on the UE. Images tagged with "extract" are passed on to the extraction process.

For example, as illustrated in Option 1, a user captures an image 422 (e.g., a landscape scene) on the UE 420. The classification model operation classifies the image as Type 1 (e.g., an actual image without notation data), and the image 422 is saved to the UE 420 and/or a cloud computing system associated with the UE 420. As illustrated in Option 2, a user captures an image 424 (e.g., a screen shot of a landscape scene with a comment) on the UE 420. The classification model operation classifies the image as Type 2 (actual image without notation data), and the image 422 is are passed on to the extraction process. For example, the image 424 may be processed to extract content 426, analyze text 428, and provide a user notification on the UE 420 such as, for example, "Your last picture appears to have been intended to store information. We've extracted the information and associated the text to contact "John Doe." Do you want to save it and deleted the original picture?"

STAGE 2: Extract Content

Upon complete of stage 1, the tagged image (e.g., image tagged with "extraction" tag) may be prepared by the extraction component 450 for a natural language processing ("NLP) operation, AI operation, and/or an optical character recognition scan. For example, the processing may include automatically adjusting the sharpness, brightness, contracts, etc. The image may be transformed to grayscale, if selected. The NLP operation, AI operation, and/or OCR search/scan may extract all information in text-form from the image. The extraction component 450 and/or the machine learning component 480 may be used to perform the NLP operation, AI operation, and/or OCR search/scan.

Additionally, one or more extraction operations may be employed by the extraction component 450 to extract further information such as, for example, a company logo.

For example, if an image of a product is captured as a reminder, the logo can be used to associate the image with the product on a website, and a link can be stored instead of the actual image. The extracted information and original image may be saved and cached for a final or user evaluation.

STAGE 3: Content Analysis

Upon completion of state 2, the analysis component 460 may analyze the extracted information to derive an intent and/or purpose behind capturing this "image note." The content may be scanned for phrases, character patterns, and/or other expressions that match against a repository of regular expressions, which may be included in the analysis component 460. These include, but are not limited to: email address, dates, times, locations/coordinates, flight numbers/confirmation codes, telephone numbers, website links, credit card numbers, social media handles, shipping tracking numbers, or other user defined data. The content may be searched and/or scanned for keywords, phrases, expressions, and/or other data indicating or appearing as notation data. These keywords, phrases, expressions, for example, may be based on or related to each specific user. Over time, a domain knowledge (e.g., ontology or dictionary) of keywords, phrases, expressions may be personalized for each user to reflect unique preferences, interests, and/or behaviors. For example, the keywords, phrases, expressions may include, but are not limited to: names of people/contacts, book titles/identification numbers, "SSID" indicating Wi-Fi network information, movie titles, and/or comments relating to a course of action (e.g., I need to call user X"). The results may be stored (e.g., cache/memory 28 and/or on the UE) and may replace the initial, extracted content alongside the original image.

STAGE 4: User Notification

The notification component 470 may share the analyzed content information with the user for final evaluation. The notification component 470 may notify a user to implement one or more suggested courses of action. Alternatively, the notification component 470 may automatically implement one or more courses of action. The results of the extracted information may be displayed on the UE (e.g., using a graphical user interface "GUI" of the UE) with one or more proposed action. For example, if a date/time is the notation data extracted from the image, a calendar entry may be created. If a name of a contact is identified and extracted, the text may be linked to the contact via the notification component 470, making it easily available when searching for the contact by a user. If a name of a movie is identified and extracted, theaters playing the movie and/or commercial enterprises selling the movie may be displayed with the option to remind the user at a later period of time. If Wi-Fi information is identified and extracted, the network may be added to the UE. If no action can be attributed, the recognized text may be stored as character data in a native note (e.g., customizable to be saved within the user's favorite reminder application associated with the UE) to save storage space. The user may be asked, via the notification component 470, for final verification of the proposed action. The original image may be deleted upon verification by user and the content is stored in the new proposed form.

STAGE 5: Feedback and Self-Learning

The machine learning component 480 may also collect and/or receive user feedback to learn and improve the personalization of information extracted for each user and to improve the accuracy of the intelligent image note processing service 410. The intelligent image note processing service 410 may consider user acceptance in Stage 4. For example, if a user does not approve the proposed action then the content analysis may be rated with a low score. However, if the user does approve the proposed action the analysis of the extracted notation data may be scored higher. The user can provide additional scoring to the extracted information such as, for example, a user specifying if all sufficient information was extracted from the image and/or if extraneous information has been extracted. Based on this feedback, the machine learning component 480 may adjusts which images are marked as note images, and what information is extracted from those images.

In one aspect, the machine learning component 480, in association with the image classification component 412 and/or the extraction component 450, and/or the analysis component 460, may employ a semantic analysis on data from one or more data sources such as, for example, IoT device 460 and 470 and can also be used to understand the type of content the user is consuming. That is, the machine learning component 480 may employ and run NLP and AI tools against the data sources and learn the data content. That is, the machine learning component 480 may learn different sets of data and may use the AI to make cognitive associations or links between one or more users, activities, behaviors, relationships, responsibilities, concepts, methods, features, characteristics, schedules, events, decision elements, alternatives to a decision, alternative options/choices/events, decision criteria, concepts, suggestions and/or an underlying common activity.

It should be noted that as used herein, the machine learning component 480 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
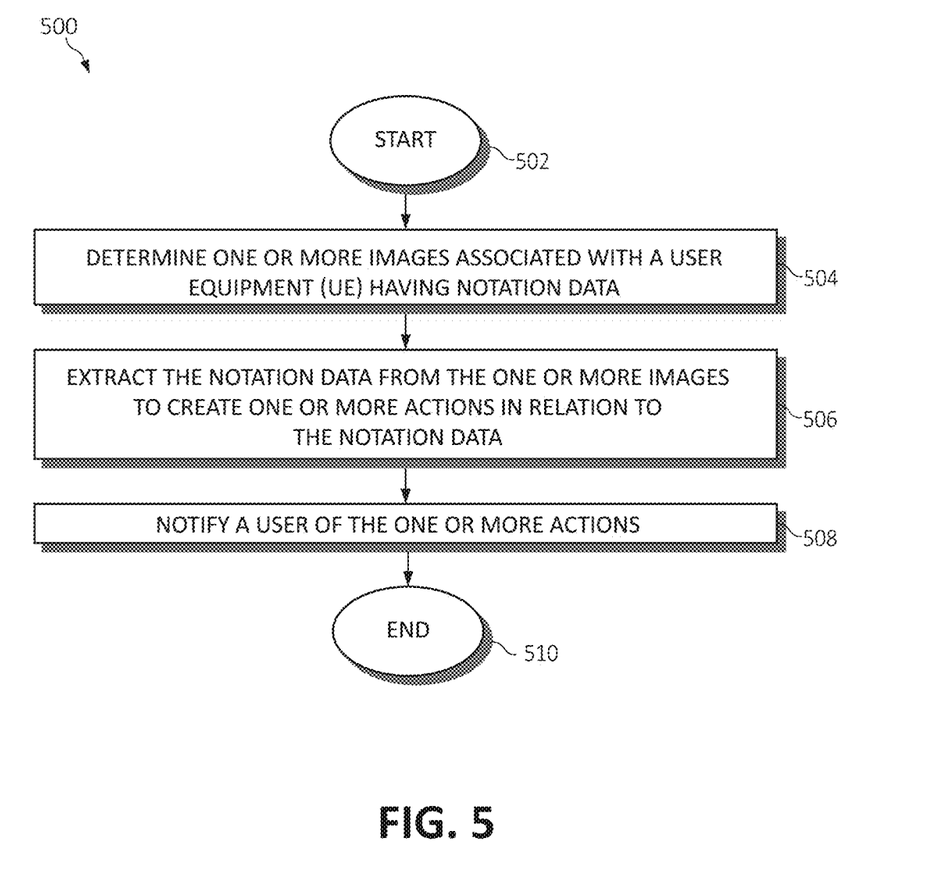
FIG. 5 is an additional flowchart diagram depicting an additional exemplary method for intelligent image note processing by a processor, again in which aspects of the present invention may be realized.

Turning now to FIG. 5, a method 500 for intelligent image note processing by a processor is depicted, in which various aspects of the illustrated embodiments may be implemented. In one aspect, each of the components, modules, and/or functions described in FIGS. 1-4 may also apply to the components, modules, and functions of FIG. 5. The functionality 500 may be implemented as a method executed as instructions on a machine, where the instructions are included on at least one computer readable medium or one non-transitory machine-readable storage medium. The functionality 500 may start in block 502.

One or more images associated with a user equipment (UE) may be determined to have notation data, as in block 504. The notation data may be extracted from the one or more images to create one or more actions in relation to the notation data, as in block 506. A user may be notified of the one or more actions, as in block 508. The functionality 500 may end, as in block 510.

Figure 6:
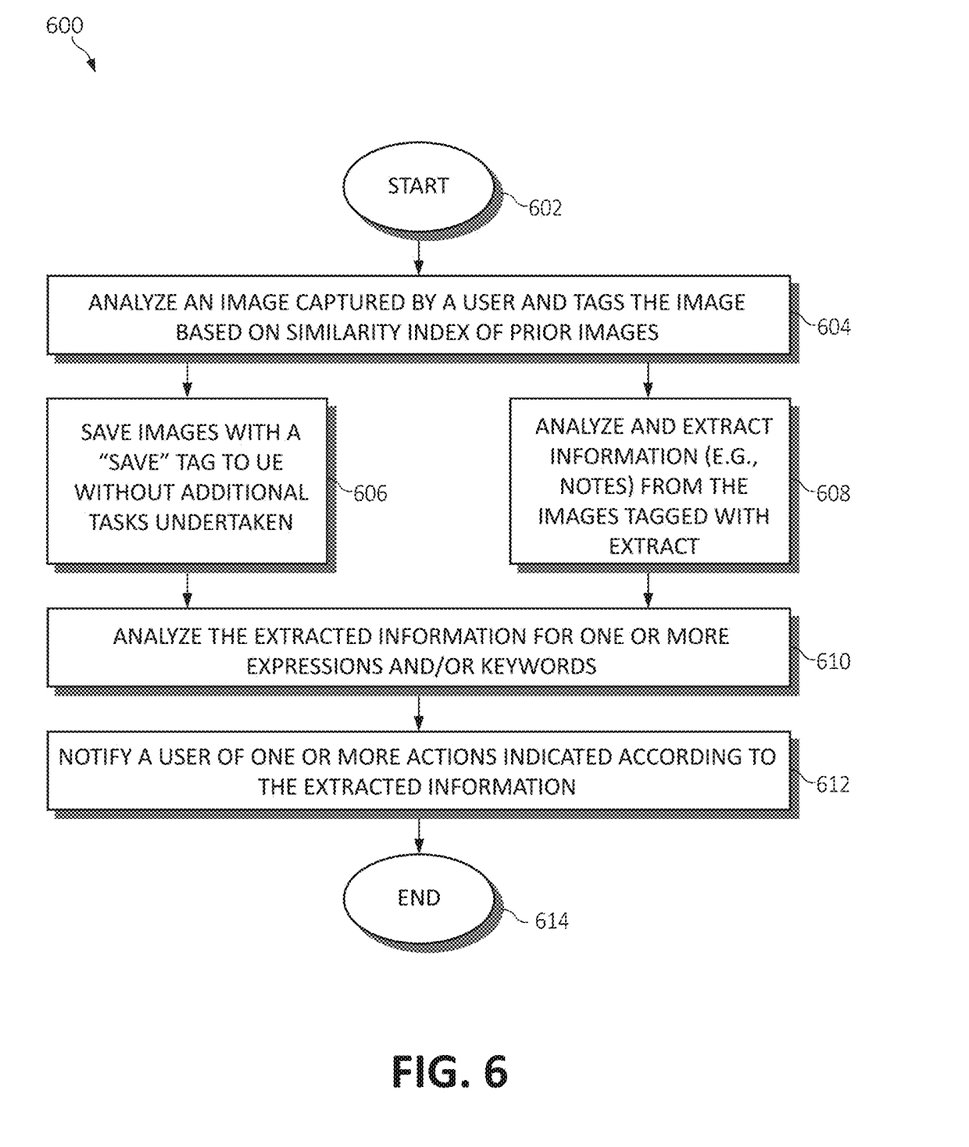
FIG. 6 is an additional flowchart diagram depicting an additional exemplary method for intelligent image note processing by a processor, again in which aspects of the present invention may be realized.

Turning now to FIG. 6, a method 600 intelligent image note processing by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

An image, captured by a user (e.g., via an image capturing device), may be analyzed and the image may be tagged based on similarity index of prior images as either save or extract, as in block 604. The image tagged with a "save" tag may be saved to a UE without additional tasks undertaken, as in block 606. Data/information (e.g., notes) may be analyzed and extracted from the images tagged with an "extract" tag, as in block 608. The extracted information may be analyzed for one or more expressions and/or keywords (e.g., using an NLP operation), as in block 610. A user may be notified of one or more actions indicated according to the extracted information, as in block 612. The functionality 600 may end, as in block 614.

In one aspect, in conjunction with and/or as part of at least one block of FIGS. 5-6, the operations of methods 500 and 600 may include each of the following. The operations of methods 500 and 600 may tag one or more images (e.g., new images captured on an image capturing device) to extract the notation data and/or tag other images failing to include the notation data.

The operations of methods 500 and 600 may initiate a machine learning operation to learn a classification model such that the classification model distinguishes between those of the one or more images having the notation data and those of the one or more images failing to include the notation data. NLP may be used to extract the notation data. One or more images may be analyzed to learn an intent or purpose of the notation data. One or more actions indicated by the notation data may be performed.

The operations of methods 500 and 600 may notify a user of the one or more actions on the UE, and/or collect feedback data relating to an evaluation by the user of the one or more actions in relation to the notation data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent image note processing by a processor, comprising:
   determining one or more images associated with a user equipment (UE) having notation data, wherein the determining includes analyzing the one or more images, utilizing a machine learning operation, to identify those of the one or more images having the notation data according to learned behaviors and preferences of a user;
   extracting the notation data from the one or more images, wherein the extracting includes identifying, through analyzation of a stylized logo depicted within the one or more images, a business producing a product captured as the notation data within the one or more images;
   automatically creating one or more actions to be performed by the UE according to the notation data, wherein the creating of the one or more actions includes generating a link to a website associated with the product of the business using data not explicitly referenced in the one or more images, and storing the link to the website on the UE in place of the one or more images;
   notifying the user of the one or more actions to be performed on the UE; and
   collecting feedback data relating to an evaluation by the user of the one or more actions in relation to the notation data, wherein collecting the feedback data is used to improve the machine learning operation and includes querying the user, by the UE, whether sufficient information was extracted from the notation data to automatically create the one or more actions and whether extraneous information relating to the one or more actions was extracted from the one or more images.

2. The method of claim 1, further including:
tagging the one or more images to extract the notation data; or
tagging the one or more images failing to include the notation data.

3. The method of claim 1, further including initiating the machine learning operation to learn a classification model such that the classification model distinguishes between those of the one or more images having the notation data and those of the one or more images failing to include the notation data.

4. The method of claim 1, further including using natural language processing (NLP) to extract the notation data.

5. The method of claim 1, further including analyzing the one or more images to learn an intent or purpose of the notation data.

6. The method of claim 1, further including performing the one or more actions indicated by the notation data.

7. A system for intelligent image note processing, comprising:
one or more computers with executable instructions that when executed cause the system to:
determine one or more images associated with a user equipment (UE) having notation data, wherein the determining includes analyzing the one or more images, utilizing a machine learning operation, to identify those of the one or more images having the notation data according to learned behaviors and preferences of a user;
extract the notation data from the one or more images, wherein the extracting includes identifying, through analyzation of a stylized logo depicted within the one or more images, a business producing a product captured as the notation data within the one or more images;
automatically create one or more actions to be performed by the UE according to the notation data, wherein the creating of the one or more actions includes generating a link to a website associated with the product of the business using data not explicitly referenced in the one or more images, and storing the link to the website on the UE in place of the one or more images;
notify the user of the one or more actions to be performed on the UE; and
collect feedback data relating to an evaluation by the user of the one or more actions in relation to the notation data, wherein collecting the feedback data is used to improve the machine learning operation and includes querying the user, by the UE, whether sufficient information was extracted from the notation data to automatically create the one or more actions and whether extraneous information relating to the one or more actions was extracted from the one or more images.

8. The system of claim 7, wherein the executable instructions further:
tag the one or more images to extract the notation data; or
tag the one or more images failing to include the notation data.

9. The system of claim 7, wherein the executable instructions further initiate the machine learning operation to learn a classification model such that the classification model distinguishes between those of the one or more images having the notation data and those of the one or more images failing to include the notation data.

10. The system of claim 7, wherein the executable instructions further use natural language processing (NLP) to extract the notation data.

11. The system of claim 7, wherein the executable instructions further analyze the one or more images to learn an intent or purpose of the notation data.

12. The system of claim 7, wherein the executable instructions further perform the one or more actions indicated by the notation data.

13. A computer program product for intelligent image note processing by a processor, the computer program product comprising a non-transitory computer-readable storage medium having computer-readable program code portions stored therein, the computer-readable program code portions comprising:
an executable portion that determines one or more images associated with a user equipment (UE) having notation data, wherein the determining includes analyzing the one or more images, utilizing a machine learning operation, to identify those of the one or more images having the notation data according to learned behaviors and preferences of a user;
an executable portion that extracts the notation data from the one or more images, wherein the extracting includes identifying, through analyzation of a stylized logo depicted within the one or more images, a business producing a product captured as the notation data within the one or more images;
an executable portion that automatically creates one or more actions to be performed by the UE according to the notation data, wherein the creating of the one or more actions includes generating a link to a website associated with the product of the business using data not explicitly referenced in the one or more images, and storing the link to the website on the UE in place of the one or more images;
an executable portion that notifies the user of the one or more actions to be performed on the UE; and
an executable portion that collects feedback data relating to an evaluation by the user of the one or more actions in relation to the notation data, wherein collecting the feedback data is used to improve the machine learning operation and includes querying the user, by the UE, whether sufficient information was extracted from the notation data to automatically create the one or more actions and whether extraneous information relating to the one or more actions was extracted from the one or more images.

14. The computer program product of claim 13, further including an executable portion that:
tags the one or more images to extract the notation data; or
tags the one or more images failing to include the notation data.

15. The computer program product of claim 13, further including an executable portion that initiates the machine learning operation to learn a classification model such that the classification model distinguishes between those of the one or more images having the notation data and those of the one or more images failing to include the notation data.

16. The computer program product of claim 13, further including an executable portion that:
uses natural language processing (NLP) to extract the notation data; and analyzes the one or more images to learn an intent or purpose of the notation data.

17. The computer program product of claim 13, further including an executable portion that performs the one or more actions indicated by the notation data.

\* \* \* \* \*